(12) United States Patent
Wang et al.

(10) Patent No.: US 6,415,287 B1
(45) Date of Patent: Jul. 2, 2002

(54) METHOD AND SYSTEM FOR MINING WEIGHTED ASSOCIATION RULE

(75) Inventors: Wei Wang; Jiong Yang, both of White Plains; Philip Shi-Lung Yu, Chappaqua, all of NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/487,797

(22) Filed: Jan. 20, 2000

(51) Int. Cl.[7] .............................................. G06F 17/30
(52) U.S. Cl. ........................ 707/6; 707/1; 707/3; 707/7; 707/101; 707/102
(58) Field of Search ............................. 707/6, 10, 101, 707/102, 1, 3, 7

(56) References Cited

U.S. PATENT DOCUMENTS

| | | | | | |
|---|---|---|---|---|---|
| 5,819,266 | A | * | 10/1998 | Agrawal et al. | 707/6 |
| 5,842,200 | A | * | 11/1998 | Agrawal et al. | 700/90 |
| 5,943,667 | A | * | 8/1999 | Aggarwal et al. | 707/10 |
| 5,987,470 | A | * | 11/1999 | Meyers et al. | 707/102 |
| 6,173,280 | B1 | * | 1/2001 | Ramkumar et al. | 707/102 |
| 6,189,005 | B1 | * | 2/2001 | Chakrabarti et al. | 707/1 |
| 6,230,153 | B1 | * | 5/2001 | Howard et al. | 705/5 |

OTHER PUBLICATIONS

Mining Association rules item constraints, by Srikant, Vu and Agrawal; IBM Alameden Research Center, 1997.*
Fast algorithm for mining association rules, by Agrawal and Srikant; IBM Almaden Research Center.*
Finding interesting rules form large sets of discovered association rules, by Klemettinen, Mannila, Ronkainen, Toivenen and Verkamo; third International conference on information and knowledge management, Nov/Dec., 1994, ACM Press.*
Parallel Mining of Association rules: Design, implementation and experience by agrawal and shafer; IBM research report, Feb. 1996.*
Arawal et al., "Mining Association rules between sets of items in large databases", Proc 1993 ACM Sigmod conference, pp. 207–216.*
Agrawal et al., "database mining: A performance perspective", IEEE, 1993, pp. 914–925.*
Cai et al., "Mining Association rules with weighted terms", IEEE, Feb. 1998, pp. 68–77.*
Lin et al., "Mining association rules: anti–skew algorithms", IEEE, Feb. 1998, pp. 486–493.*
R. Agrawal et al., Mining Association Rules Between Sets of Items in Large Databases; 1993 ACM SIGMOD. Conference on Management of Data, Washington DC, May, 1993.
R. Srikant, et al., Mining Quantitative Association Rules in Large Relational Tables; 1996 ACM SIGMOD. Conference on Management of Data, Montreal, Canada, Jun., 1996; pp. 1–12.

* cited by examiner

Primary Examiner—Jean Corrielus
(74) Attorney, Agent, or Firm—McGuireWoods LLP; Gail H. Zarick, Esq.

(57) ABSTRACT

The traditional association rule problem is extended by allowing a weight to be associate with each item in a transaction to reflect interest/intensity of each item within the transaction. The weighted association rules from a set of tuple lists are discovered, where each tuple consists of an item and an associated weight and each tuple list consists multiple tuples. The weighted association rules (WARs) are generated where some subset of items forms the consequent part of the rule (i.e., right hand side of the rule) and some other (non-overlapped) subset of items from the antecedent part of the rule (i.e., left hand side of the rule). The range of the weight value of each item is specified in the said rule such that the number of tuples satisfying both the left hand side and right hand side of the rules exceeds a pre-specified support level (referred to as the support requirement) and the fraction of tuples satisfying the left hand side also satisfying the right hand side exceeds a pre-specified confidence level (referred to as the confidence requirement).

36 Claims, 12 Drawing Sheets

METHOD AND SYSTEM FOR MINING WEIGHTED ASSOCIATION RULE

BACKGROUND OF THE INVENTION

1. Field of the Invention

The present invention generally relates to data mining and, more particularly, to mining association rules with numerical weighted attribute values.

2. Background Description

Data mining is the extraction of implicit knowledge and discovery of interesting characteristics and patterns that are not explicitly presented in the data. These techniques can play an important role in presenting data in a concise manner and accommodating data semantics. During recent years, one active topic in this field is association rule discovery which is introduced in R. Agrawal, T. Imielinski and A. Swami, "Mining association rules between set of items in large databases", *Proceedings of the* 1993 *ACM SIGMOD Conference on Management of Data,* 1993. In general, the problem can be modeled as follows: let I be a set of items and T be a set of transactions, each of which consists of a subset of items in I. An association rule is an implication in the form of "X→Y", where X and Y are sets of disjoint item sets. "X→Y" holds in T with support s and confidence c if s % transactions contain all items in the set "X∪Y" and c % transactions which contain all items in X also contain all items in Y. The goal of association rule mining process is to find all these rules with respect to some minimum s and c. An item (or itemset) is called a "frequent" item (or itemset) if its support is at least s.

These conventional association rules have been widely used in many application domains. In the market basket problem, each piece of merchandise in a supermarket can be viewed as an item, and the set of items that a customer purchases at one time period can be viewed as a transaction. The association rules represent the likelihood of items being purchased together by a customer. Thus, this knowledge can be used to guide sale promotions. For example, if there is a high confidence between soda and snacks, then the supermarket may reduce the price of soda to increase the sale of snacks.

However, the traditional association rules focus on binary attributes. In other words, this approach only considers whether an item is present in a transaction, but does not take into account the weight/intensity of an item within a transaction. For example, a customer may purchase ten bottles of soda and five bags of snacks and another may purchase four bottles of soda and one bag of snacks at a time. However, these two transactions will be the same in the conventional association rule approach. This could lead to loss of some vital information; i.e., intensity or weight of each item in a transaction. For example, if a customer buys more than seven bottles of soda, he or she is likely to purchase three or more bags of snacks; otherwise, the purchase tendency of soda is not strong. The traditional association rule can not express this type of relationship. With this knowledge, the supermarket manager may set a promotion such as "if a customer buys six bottles of soda, he or she can get two free bags of snacks."

A new variation of association rules has been proposed in R. Srikant, and R. Agrawal, "Mining quantitative association rules in large relational tables", *Proceedings of the* 1996 *ACM SIGMOD Conference on Management of Data Montreal,* Canada, June, 1996. The domain of each quantitative attribute is divided into a set of intervals (i.e., buckets, ranges) via equi-depth partitioning; i.e., each interval is with a similar number of attribute values. Intervals are combined as long as their support is less than the user specified max-support. Each of original intervals and the combined intervals is treated as a different item. Thus, the attribute value of the newly "generated" items is binary: "1" stands for that the original attribute value is within the specified interval; "0" stands for that the original attribute value is not within the specified interval. The algorithms for mining traditional association rules can then be applied on these newly generated binary items.

During the mapping process, one numerical attribute will be mapped into $O(k^2)$ binary attributes where k is the number of intervals for one attribute domain. When the number of numerical attributes is large, the number of mapped binary attributes could be unmanageable.

SUMMARY OF THE INVENTION

It is therefore an object of the present invention to provide an efficient method for mining a specific type association rule, the weighted association rule.

According to the invention, The traditional association rule problem is extended by allowing a weight to be associated with each item in a transaction to reflect interest/intensity of each item within the transaction. In turn, this provides an opportunity to associate a weight parameter with each item in a resulting association rule, called a weighted association rule (WAR). For example, "soda [4, 6]→snack [3, 5]" is a weighted association rule indicating that if a customer purchases soda in the quantity between four and six bottles, he or she is likely to purchase three to five bags of snacks. Thus, WARs can not only improve the confidence of the rules, but also provide a mechanism to do more effective target marketing by identifying or segmenting customers based on their potential degree of loyalty or volume of purchases.

There can be a very large number of items in any given problem, and every item has a numerical attribute, although only a small fraction of items are present in a transaction. Thus, according to the preferred method of the present invention, the frequent itemsets are first generated (without considering weights). This method differs from the prior art. The weight range of each item in each frequent itemset is divided into a sequence of intervals, referred to as base intervals". Then the weight domain space of each frequent itemset is partitioned into fine grids. A grid is a multi-dimensional cube whose span on each dimension is exactly one base interval. The density of a grid is defined as the ratio of the actual number of transactions that belong to it over the expected number of transaction in it, assuming random uniform distribution. A density threshold is used to separate the transaction concentrating regions from the rest. A grid is called a "dense grid" if its density is above the pre-specified threshold. Otherwise, it is called a "sparse grid". A "dense region" is the union of a set of adjacent dense grids. WARs can be identified based on these "dense" regions.

In reality, the number of valid weighted association rules (WARs) could be very large, and a user may not be interested in all WARs, but rather a small subset of them. For example, if the inventory of soda becomes too large in a supermarket, the manager may be only interested in the WARs involving soda. It would be desirable if the user can interact with the mining system to obtain a set of interesting WARs by varying the parameter values. Inspired by this, the present method supports both batch mode and interactive mode. In the batch mode, all qualified WARs are returned. On the other hand, in the interactive mode, a user not only can choose a set of interesting frequent itemsets to further investigate, but also can vary the support, interest, and density thresholds, so that only those qualified WARs for the interesting itemsets, are returned.

The present invention can be summarized as follows.
1) A new class of association rule problem, WAR, is proposed.
2) Due to the nature of this problem, the mining process is accomplished by a threefold approach:
   a) First generating frequent itemsets and then deriving WARs from each frequent itemset.
   b) During the frequent itemset generation process, the associated weight is ignored. An itemset is a frequent itemset if this itemset appears in at least a certain percentage of the transactions.
   c) During the WAR derivation process, the weight domain space is partitioned in such a manner that the total number of grids is limited by some parameter N so that the available memory/storage space can be fully utilized. The concept of density is employed to separate transaction-concentrated, or dense, regions from the rest. An efficient ordered shrinkage algorithm is proposed to derive WARs from a high density region through shrinkages.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
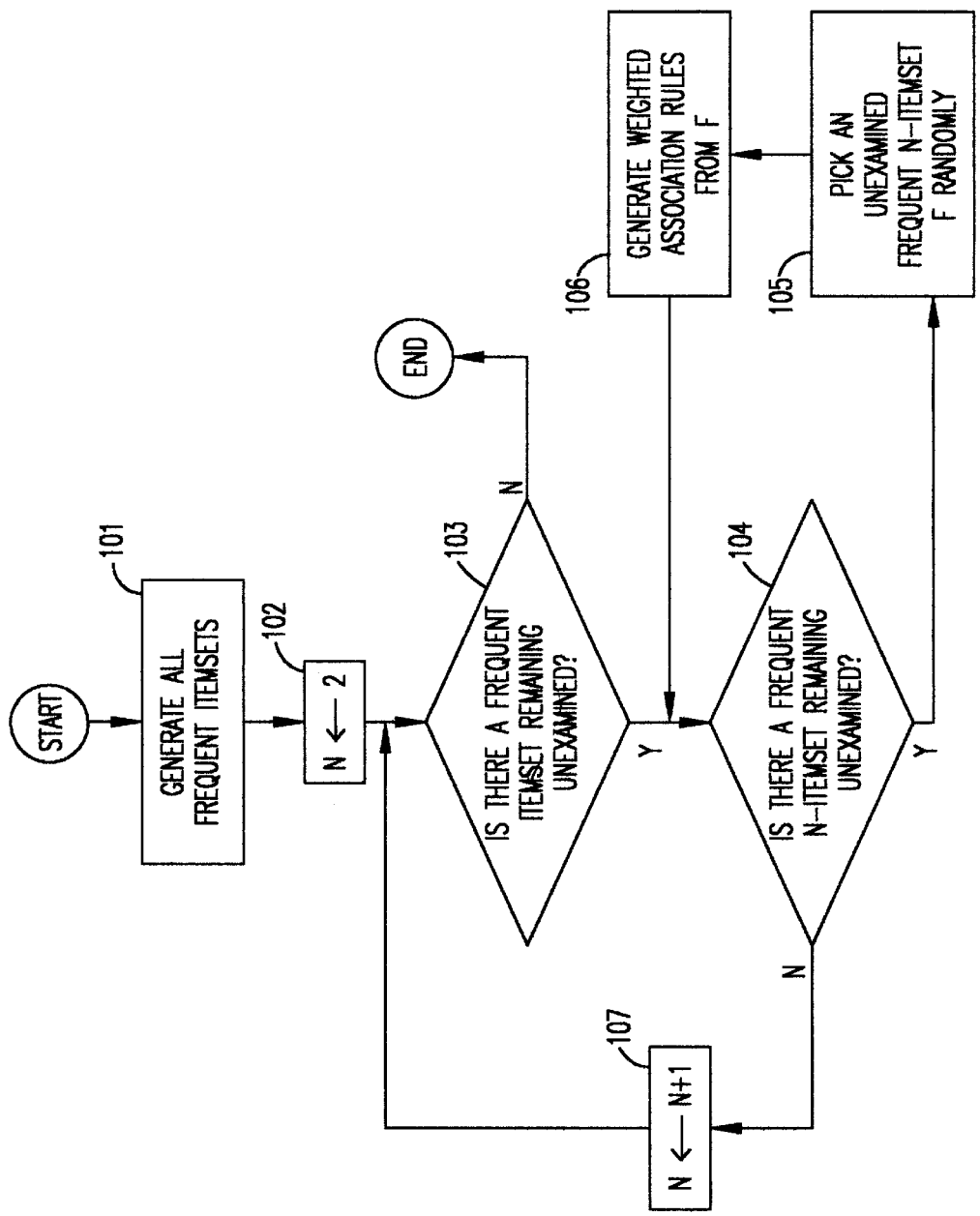
FIG. 1 is a flow diagram depicting the overall process of mining WARs from a given data set in this invention.
Figure 9:
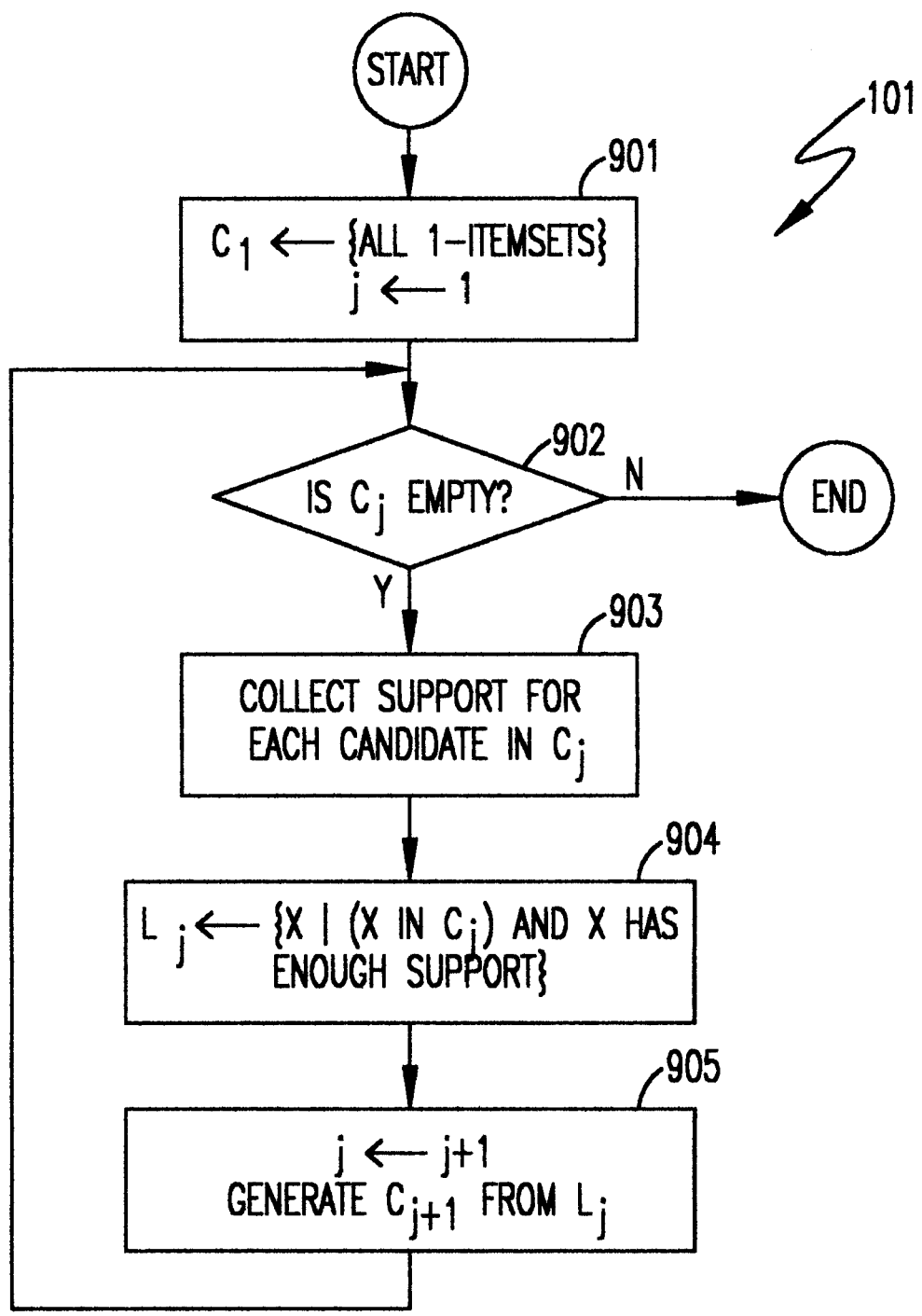
FIG. 9 is a flow diagram depicting the frequent itemset generation process.

Referring now to the drawings, and more particularly to FIG. 1, there is shown the overall process of mining weighted association rules (WARs) in this invention. First, all frequent itemsets are generated from the given set of transactions in function block 101. Referring now to FIG. 9, there is shown the frequent itemset mining process. This process is first introduced in R. Agrawal, T. Imielinski and A. Swami, "Mining association rules between set of items in large databases", supra. Let C1 be the candidate set of 1-itemset which contains only a single item in function block 901. Also, initialize j to be 1. If $C_j$ is not empty, as determined in decision block 902, the support is collected for each itemset in $C_j$ in function block 903. If there are any itemsets whose support is larger than the support threshold, these itemsets are put into $L_j$ in function block 904. Based on $L_j$, $C_{j+1}$ is constructed in function block 905 as follows. A itemset with j+1 items is added to $C_{j+1}$ if there exists j+1 distinct itemsets which are in $L_j$.

Referring again to FIG. 1, these frequent itemsets will be examined sequentially in the increasing order of their cardinality. The cardinality of an itemset is defined as the number of items in the itemset. Two-itemsets will be examined first. The process enters a processing double loop. The outer loop begins with a test in decision block 103 to determine if there is a frequent itemset remaining unexamined. If so, the inner loop begins with a test in decision block 104 to determine if there is a frequent n-itemset remaining unexamined. If so, an unexamined frequent n-itemset is picked in function block 105 and the weighted association rules are generated in function block 106. The inner process loops back to decision block 104 until all frequent n-itemsets have been examined. Every time the process exits from an inner loop, the cardinality of the itemsets being examined is incremented by 1 in function block 107. The entire process loops back to decision block 103 until all frequent itemsets have been examined.

Figure 2:
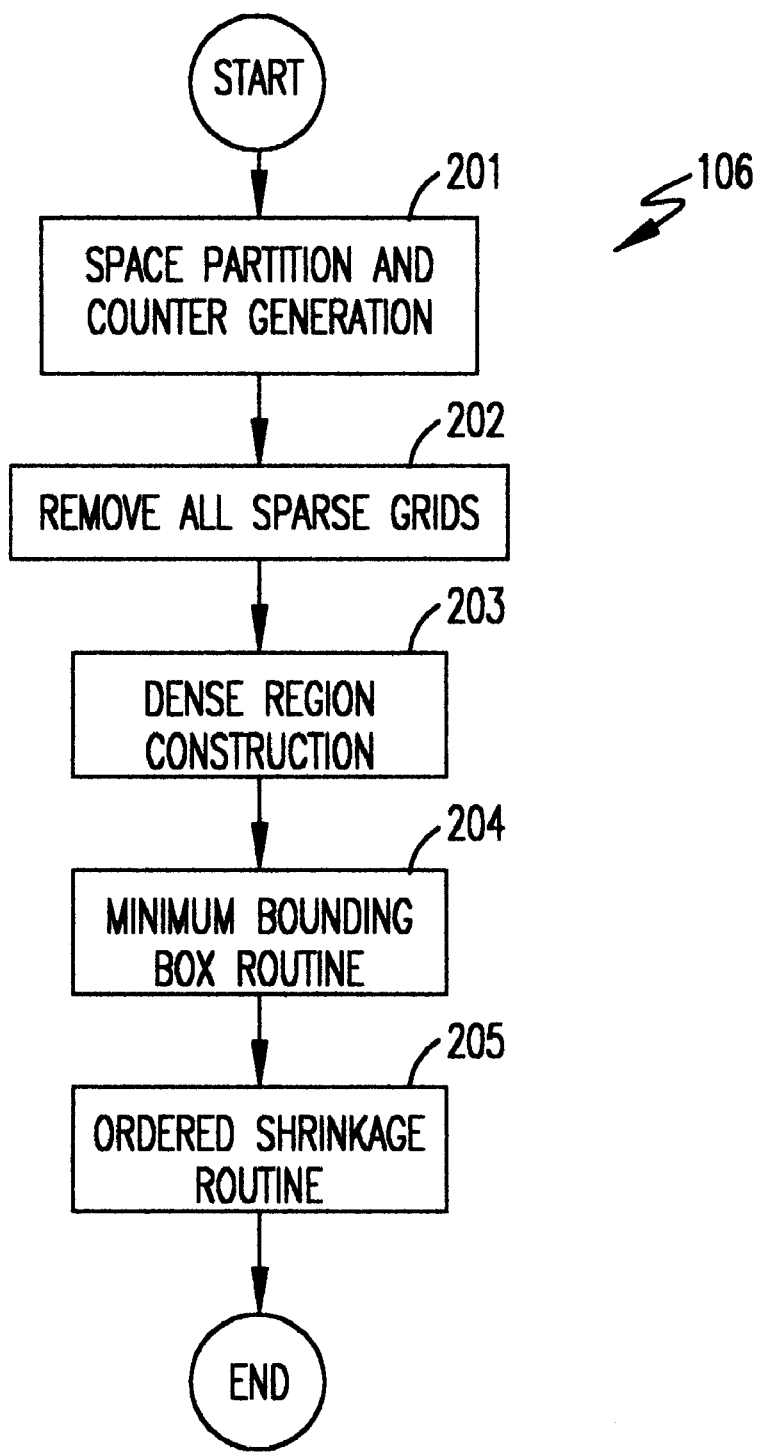
FIG. 2 is a flow diagram depicting the process of generating WARs for a given itemset.

FIG. 2 depicts the process of generating WARs, as shown in function block 106, for a given frequent itemset F. The weight domain space of F is partitioned into grids and the support of each grid is counted in function block 201. If a grid contains enough transactions, it is called a dense grid. All sparse (i.e., non-dense) grids are removed and only dense grids are kept for further examination in function block 202. Based on the dense grids, dense regions are constructed in function block 203. Each dense region is a set of connected dense grids. For each dense region, the minimum bounding box of that region is constructed in function block 204. An ordered shrink routine is then used to find the qualified WARs function block 204.

Figure 3:
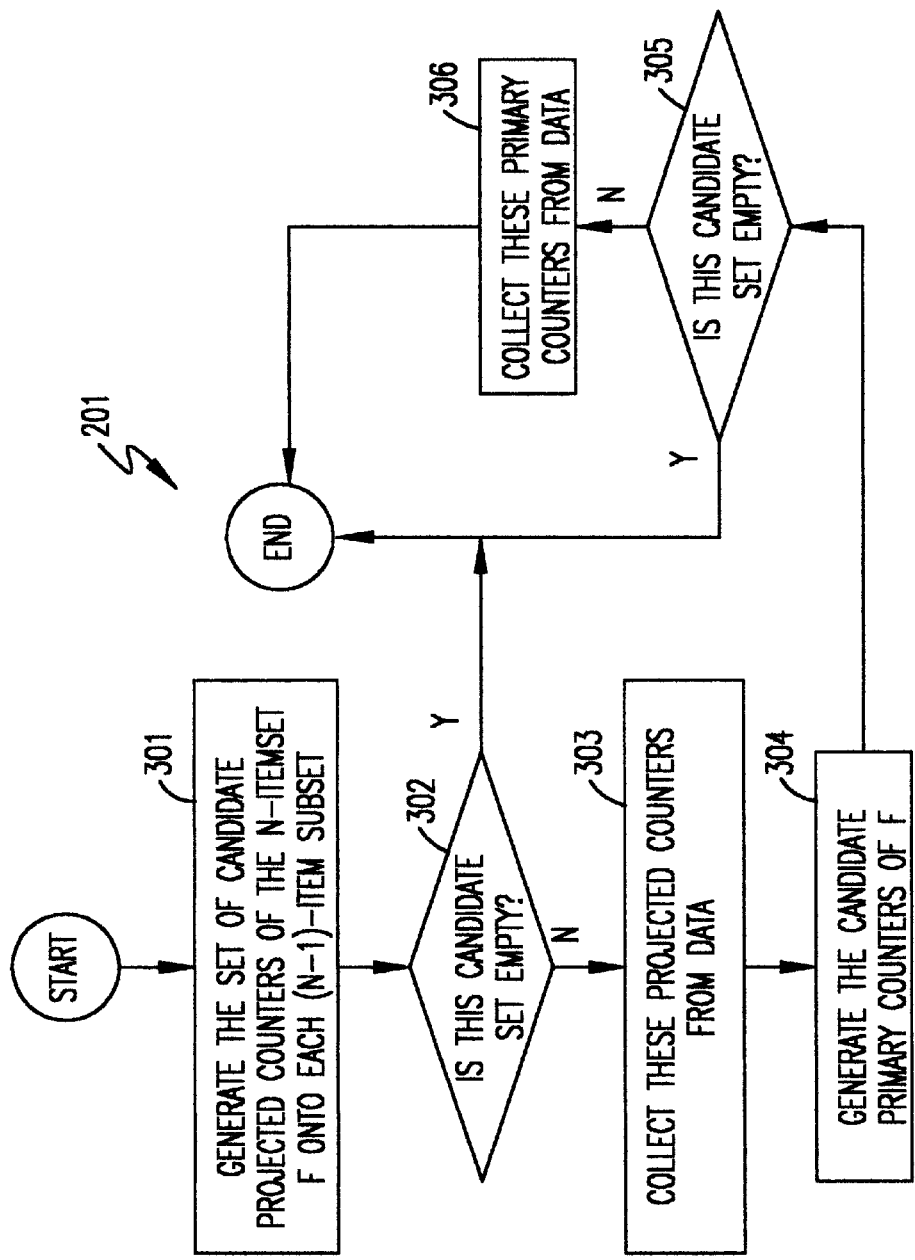
FIG. 3 is a flow diagram depicting the process of counter generation for a given itemset.

FIG. 3 describes the counter generation process, as shown in function block 201, for a given frequent n-itemset F. The set of projected counters of F onto each of the n different (n−1) item subsets are generated in function block 301. A test is made in decision block 302 to determine whether this counter set is empty. If not, the data will be scanned to obtain the value of these projected counters in function block 303. The primary counters of F are generated based on the value of projected counters in function block 304. A test in decision block 305 determines whether this counter set is empty. If not, the data is examined to obtain the value of these primary counters in function block 306.

Figure 4:
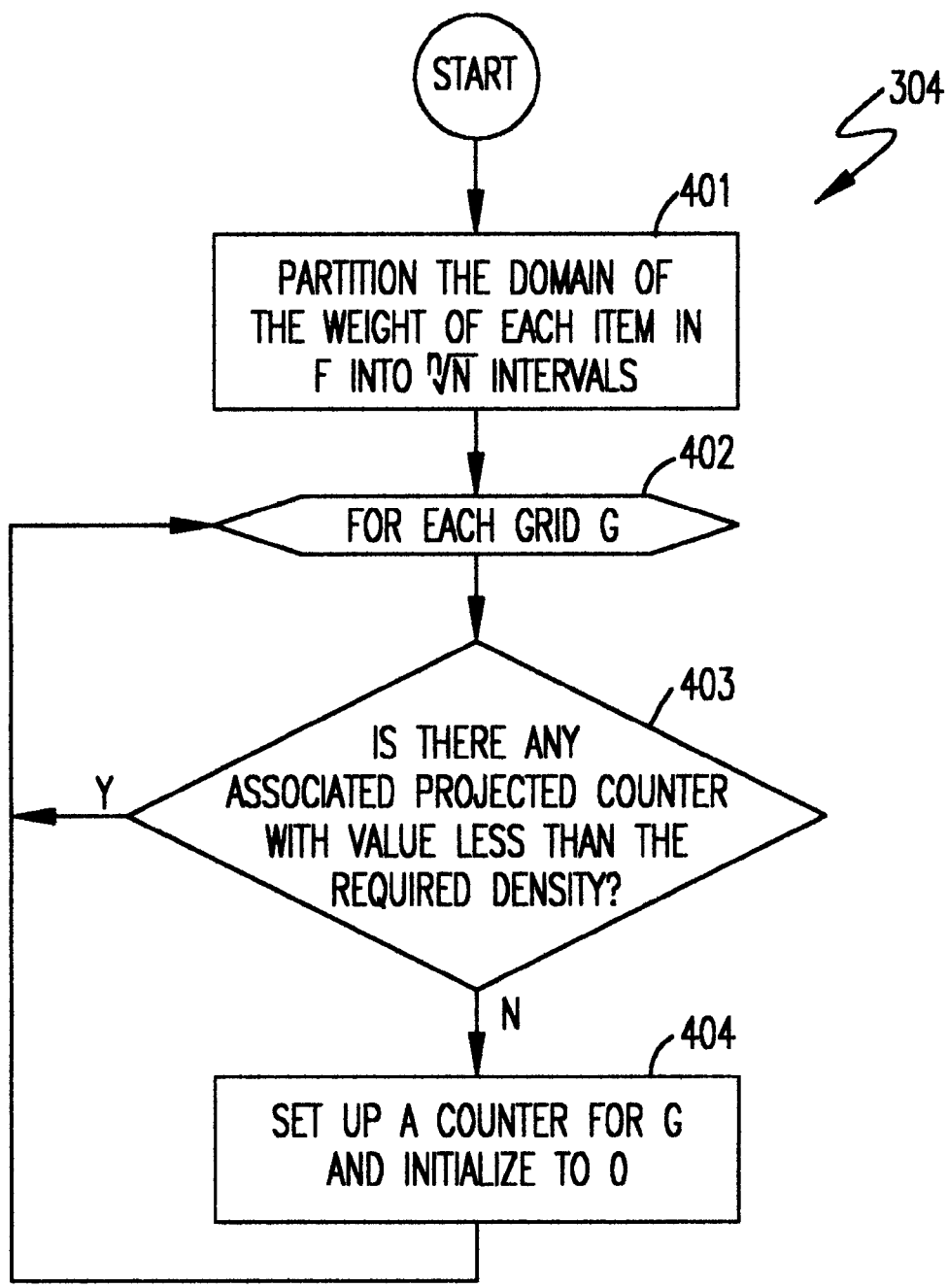
FIG. 4 is a flow diagram depicting the process of generating primary counters for a given itemset.

FIG. 4 illustrates the primary counter generation process, as shown in function block 304. First, the weight domain space of F is partitioned into grids. Each dimension is partitioned into $N^{1/n}$ intervals, where n and N are the number of dimensions and the number of desired grids in function block 401, respectively. Then the process enters a loop where for each grid g, a test is made in decision block 403 to determine whether there exists a projection of g onto the weight domain space of an (n−1) item subset of F such that the required density is not satisfied. If not, a counter for g is established and is initialized to 0 in function block 404.

Figure 5:
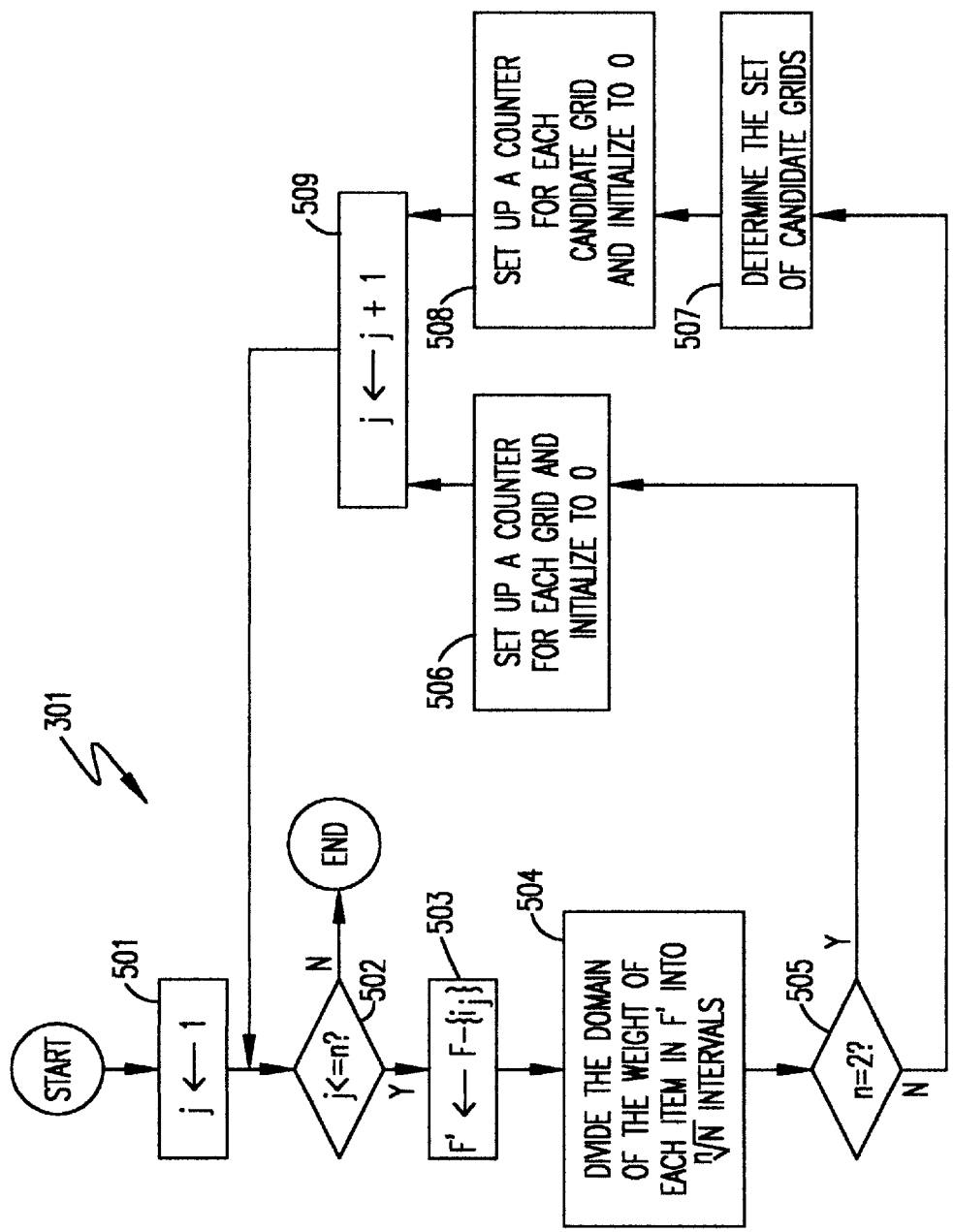
FIG. 5 is a flow diagram depicting the process of generating projected counters for a given itemset.

FIG. 5 describes the process of generating projected counters for an n-itemset F, as shown in function block 301. Each of the n possible (n−1) items subsets is examined sequentially. Before entering the process loop, the index j is set to 1 in function block 501. In the processing loop, the first step is to determine whether the index j is equal to n, assuming that F contains n items, in decision block 502. For each item i in F, i is removed from F in function block 503, and a new set F' is generated which contains n−1 items. Then each dimension of the wight domain space of F' is partitioned into $N^{1/n}$ intervals in function block 504. The total number of grids for F' is $N^{(n-1)/n}$. A test in decision block 505 determines whether F is a two-itemset. If so, a counter is established for each grid and is initialized to 0. Otherwise, the value of the primary counters of F' is employed to generate the candidate grids to set up projected counters in function block 507. Then a counter is established only on each candidate grid and is initialized to 0 in function block 508. The index j is then incremented by 1 in function block 509 before the process loops back to decision block 502.

Figure 6:
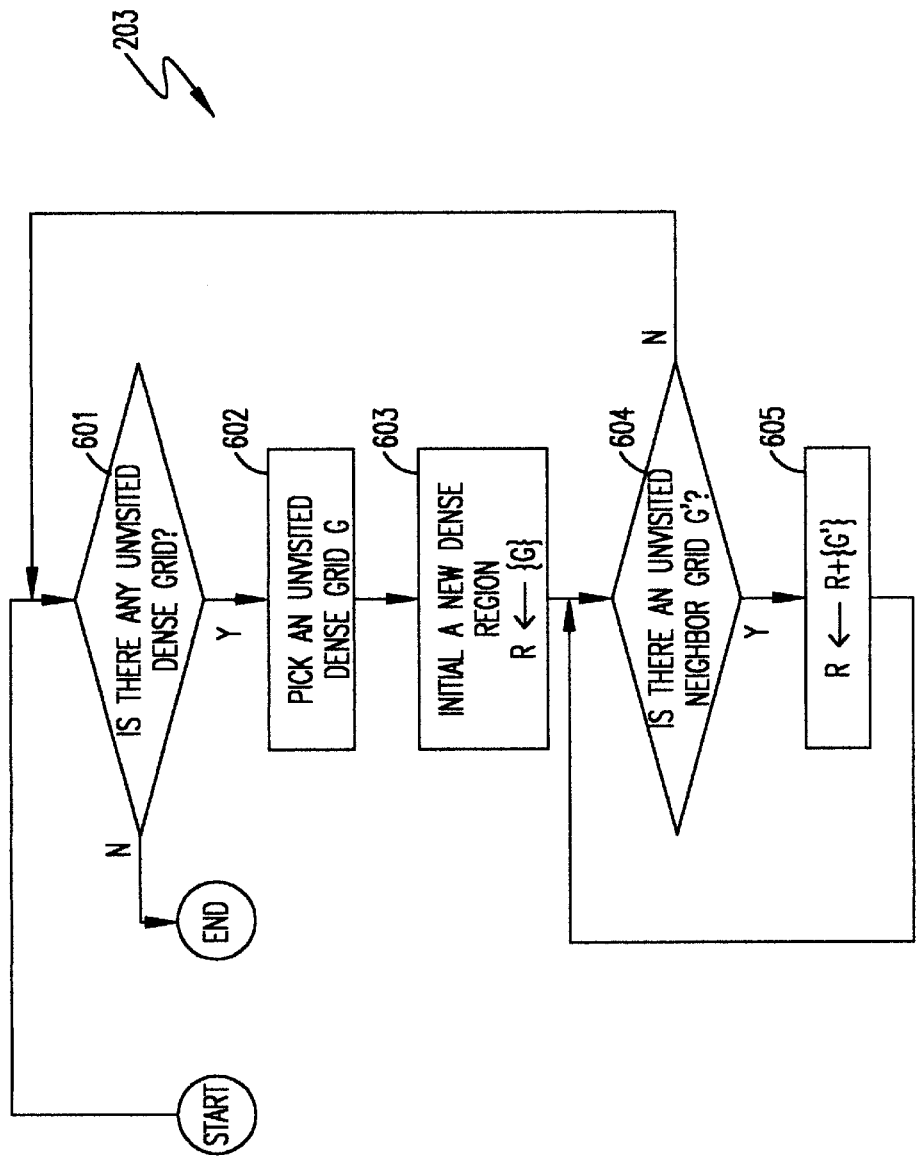
FIG. 6 is a flow diagram depicting the process of constructing dense regions based on counters.

FIG. 6 shows the process of generating dense regions from the set of primary counters, as shown in function block 203. In this process, a breadth-first algorithm is employed. The processing loop is entered at decision block 601 where a determination is made as to whether there is any unvisited grid. If so, an unvisited grid is picked randomly in function block 602. Then the grid is put into an empty region set r in function block 603. A test is made in decision block 604 to determine if there is an unvisited neighbor grid g'. If not, the process loops back to decision block 601; otherwise, all grids which are next to the grids in the region set r are added to r in function block 605. the process then loops back to decision block 604 to continue processing unvisited neighbor grids.

Figure 7:
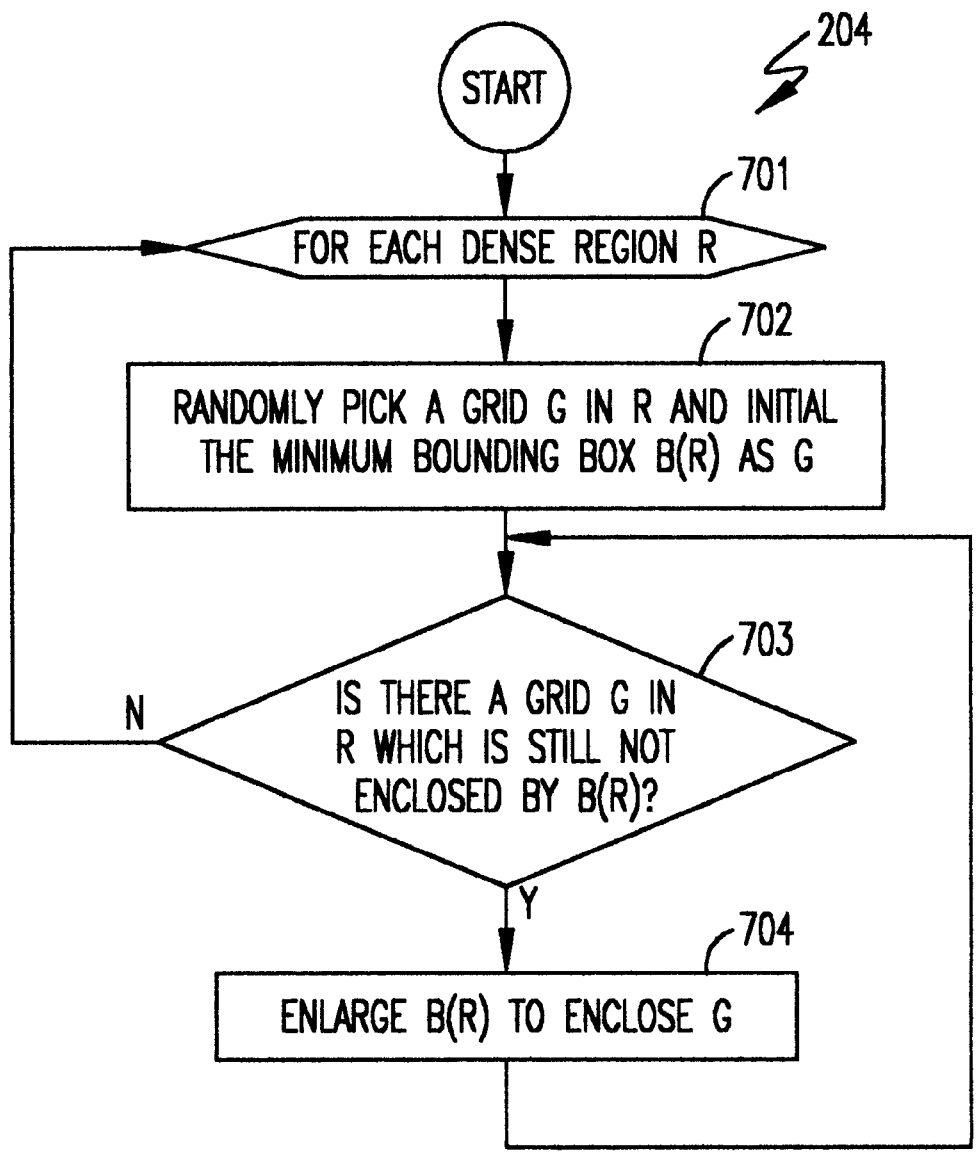
FIG. 7 is a flow diagram depicting the process of minimum bounding box discovery.

FIG. 7 depicts the process of finding the minimum bounding box for each dense region r, as shown in function block 204. First, an outer processing loop for each dense region r is entered in function block 701. A grid in r is randomly picked and the minimum bounding box is set as the grid in function block 702. The processing loop is entered at decision block 703 where a determination is made as to whether there is a grid g in r which is still not enclosed by b(r). If the minimum bounding box does not enclose r, then the box is enlarged in function block 704. This process terminates when the box encloses r.

Figure 8:
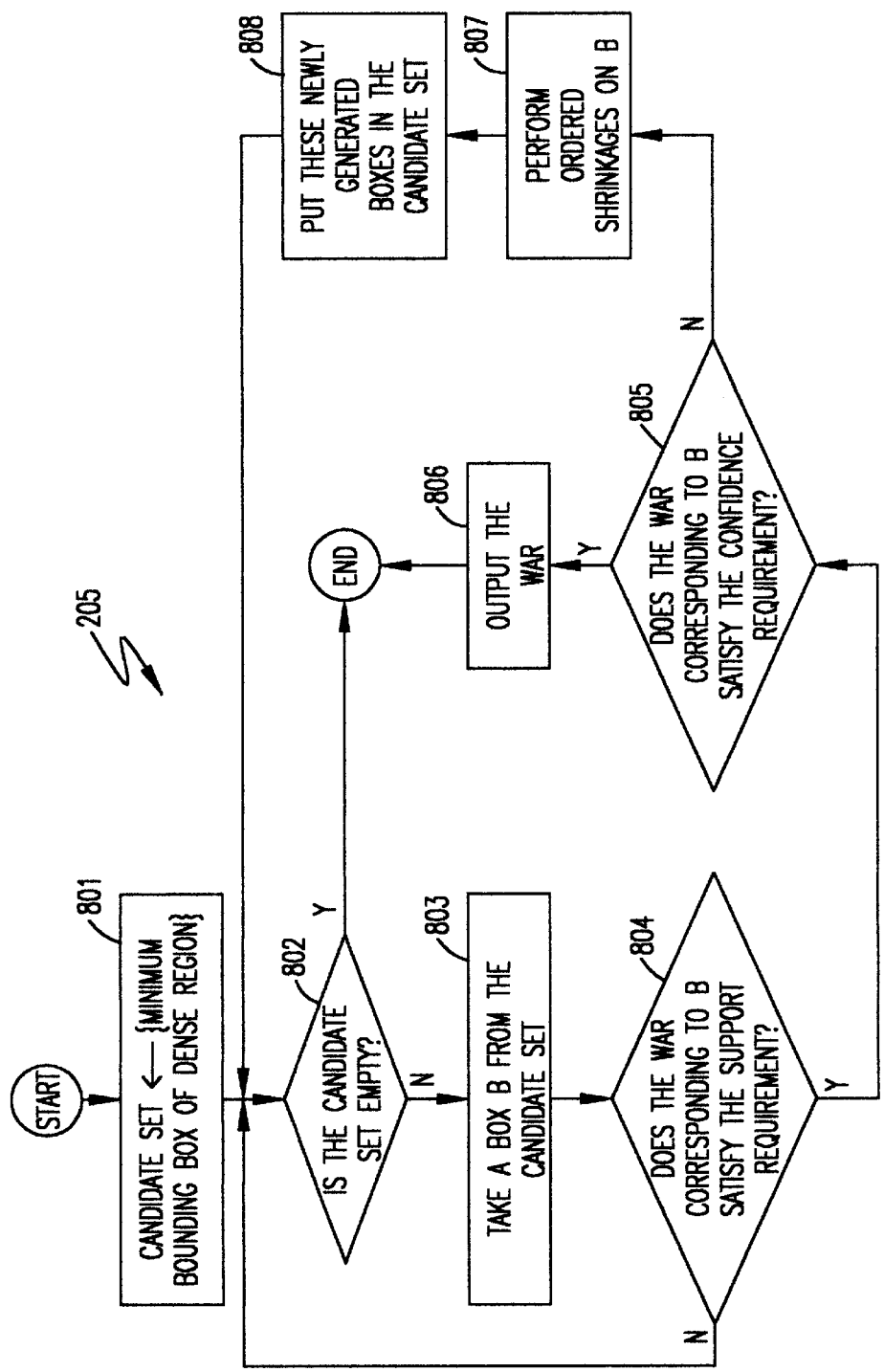
FIG. 8 is a flow diagram depicting the WAR generation process from a minimum bounding box.

FIG. 8 shows the WAR generation process from a minimum bounding box b, as shown in function block 205. First, the candidate set is initialized to contain only box b in function block 801. A determination is next made in decision block 802 as to whether the candidate set is empty. If the candidate set is not empty, a box is taken from the candidate set in function block 803. If the support of the corresponding WAR satisfies the requirement, as determined in decision block 804, then the WAR is examined in decision block 805 to determine whether it satisfies the confidence requirement. If so, the WAR is outputted at output block 806. Otherwise, an ordered shrinkage is performed in function block 807, as described below, and the resulting new grids are added to the candidate set in function block 808. The entire WAR generation process continue until the candidate set is empty.

The ordered shrinkage in function block 807 is performed as follows. For a grid with n dimensions, there are a total of 2n shrinkage options: increase the lower bound of dimension 1, decrease the upper bound of dimension 2, and so on. The shrinkage options are ordered. Let j be the largest option has been performed on box b. Then the box b will be shrunk to 2n−j+1 boxes via, the shrinkage option j, j+1, . . . , 2n. The candidate set can be organized by either a heap or a queue data structure.

A heap is essentially an array object that can be viewed as a binary tree. Each node of the tree corresponds to an element of the array that stores the value in the node. The tree is completely filled on all levels except possibly the lowest, which is filled from the left up to a point. The root of the tree is stored in the first element of the array. For the node stored in the ith element, its two immediate children, if applicable, are stored in the (2i)th and (2i+1)th elements of the array. A heap also satisfies the heap property: for every node other than the root, the value of the node is at most the value of its parent. Thus, the largest element in a heap is stored at the root, and the subtrees rooted at a node contain smaller values than does the node itself. The volume of each box in the candidate set is used as the metric to order the elements in the heap. Every time a box is added or removed, the heap will be reorganized to maintain the heap property.

Figure 10:
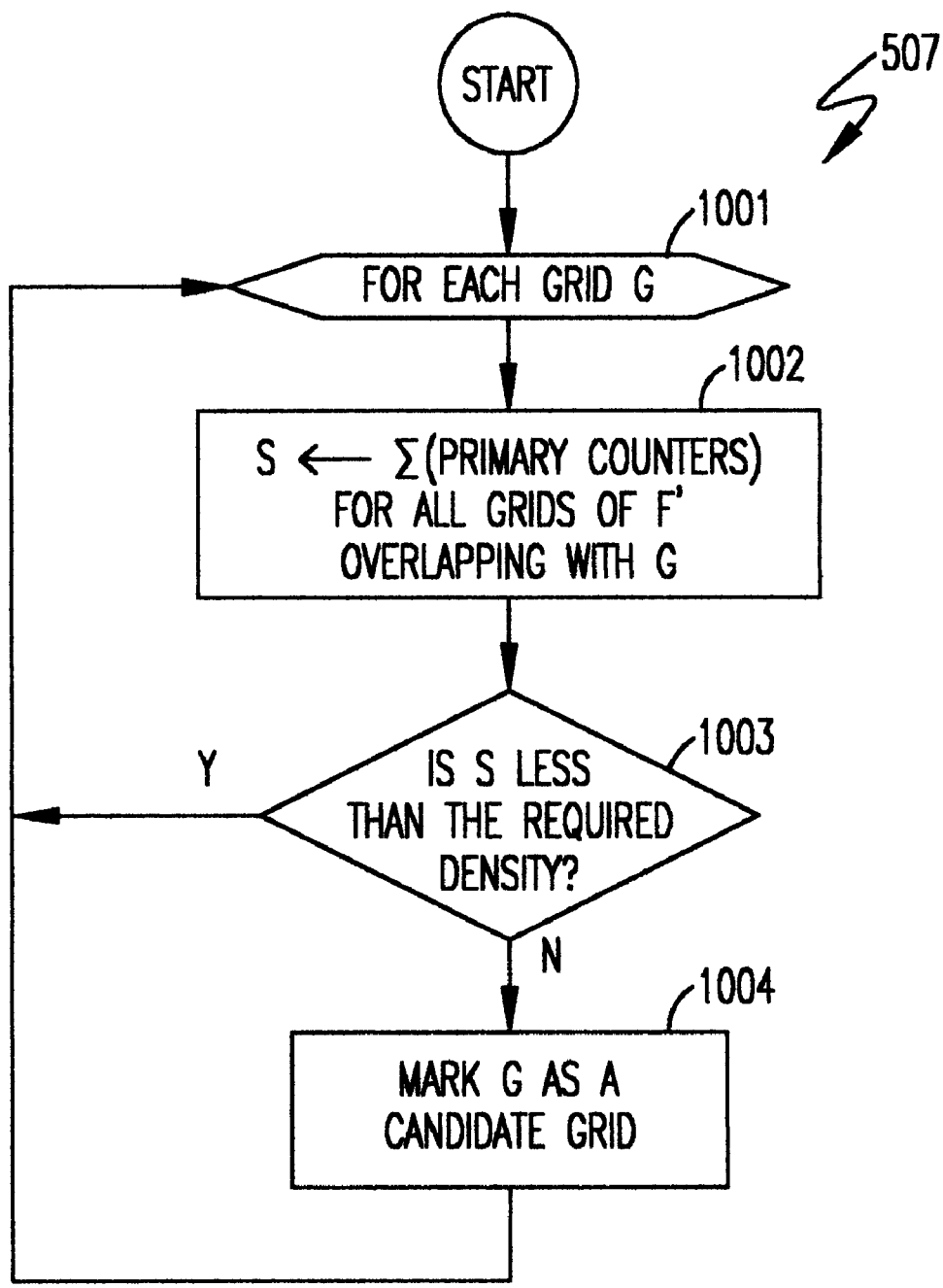
FIG. 10 is a flow diagram depicting the process of determining candidate grids for projected counters of a given itemset.

FIG. 10 describes the process to determine the candidate grids for the projected counters of a given n-itemset F onto one of its (n−1)-item subset F', as shown in function block 507. The process enters a loop where each grid is examined sequentially. For each grid g, the aggregation of all primary counters of F' whose corresponding grids overlap with g is taken in function block 1002. A test is made in decision block 1003 to determine whether this aggregated value is less than the required density. If not, g is marked as a candidate grid in function block 1004.

Figure 11:
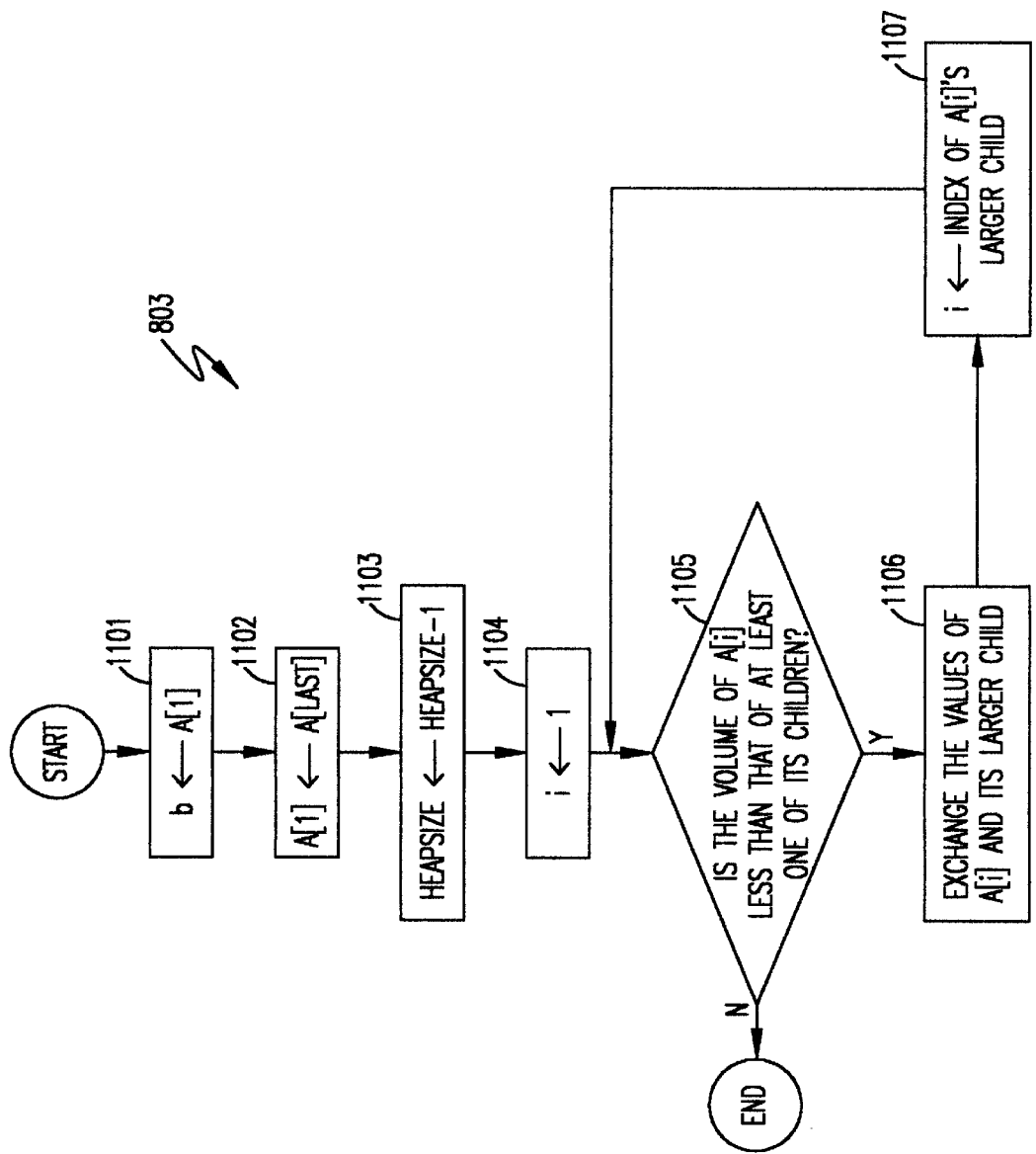
FIG. 11 is a flow diagram depicting the process of extracting the candidate box with the largest volume from the candidate set maintained via heap structure.

FIG. 11 describes the process to extract the candidate box b with the largest volume in the candidate set stored in a heap A as shown in function block 803. Candidate box b is the top heap element of the heap A in function block 1101. Then A is reorganized to maintain the heap property. The last element in A is moved to the top slot in function block 1102, and the heap size is reduced by 1 in function block 1103. Before the process enters a loop, the index i is set to 1 in function block 1104. A test in decision block 1105 determined whether the volume of the ith element is less than that of either of its children. If so, the ith element is exchanged with its larger child in function block 1106. Index i is then set to the index of this child in function block 1107. The process terminates when such a position is reached that both children have smaller volumes.

Figure 12:
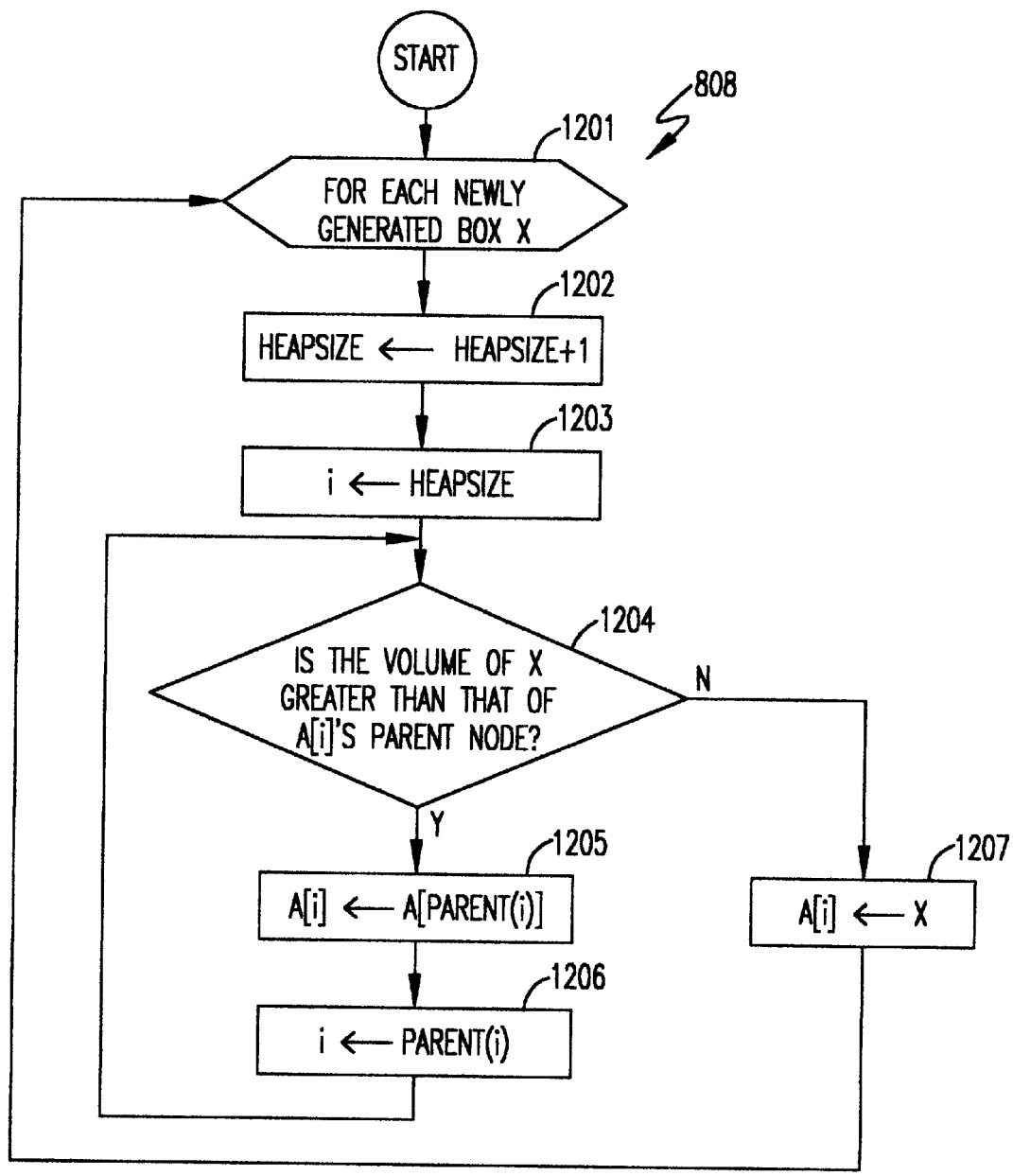
FIG. 12 is a flow diagram depicting the process of inserting new boxes into the candidate set maintained via a heap structure.

FIG. 12 describes the process to insert a set of newly generated candidate boxes into the candidate set stored in a heap A. The process is a loop process where each new box is inserted sequentially. For each new box x, the heap size is incremented by 1 in function block 1202, and the index i points to the last element of the heap in function block 1203. The process enters a loop that begins with a test decision in decision block 1204 to determine whether the volume of x is greater than that of the parent of the ith element in the heap. If so, the parent of the ith element is moved to the ith element in function block 1205 and the index i is set to the parent element in function bock 1206. The process then loops back to decision block 1204. Otherwise, x is stored in the ith element. The entire process terminates after all boxes have been inserted.

While the invention has been described in terms of a single preferred embodiment, those skilled in the art will recognize that the invention can be practiced with modification within the spirit and scope of the appended claims.

Having thus described our invention, what we claim as new and desire to secure by letters patent is as follows:

1. A method for generating weighted association rules, each rule having an antecedent part and a consequent part, from a set of tuple lists, wherein each tuple comprises an item and an associated weight and each tuple list comprises a plurality of tuples, said method comprising the step of generating weighted association rules wherein the consequent part of a rule comprises a first subset of items and the antecedent part of the rule comprises a second, non-overlapped, subset of items, and a range of weight values of each item is specified in the rule such that a number of tuples satisfying both the consequent part and the antecedent part of the rule exceeds a pre-specified support level, referred to as the support requirement, and a fraction of tuples satisfying the antecedent part also satisfying the consequent part exceeds a pre-specified confidence level, referred to as the confidence requirement and tuple density satisfying both the consequent part and the antecedent part of the rule exceeds a desired density level.

2. A method for generating weighted association rules from a set of tuple lists, wherein each tuple comprises an item and an associated weight and each tuple list comprises a plurality of tuples, said method comprising the steps of:
generating a plurality of frequent itemsets; and
from each frequent itemset, generating weighted association rules, each rule having an antecedent part and a consequent part, wherein the consequent part of a rule is formed by a first subset of items from a tuple list and all remaining items in the tuple list form the antecedent part of the rule, and a range of a weight values of each item is specified in the rule so that support, confidence and density requirements are satisfied.

3. A method as recited in claim 2, wherein all qualified weighted association rules are generated in the step of generating weighted association rules.

4. A method as recited in claim 2, wherein a selected subset of all qualified weighted association rules are generated in the step of generating weighted association rules.

5. A method as recited in claim 4, further comprising the steps of:
selecting a set of desired frequent itemsets for weighted association rule generation; and
selecting a desired value for at least one threshold from a group of thresholds including support, interest and density.

6. A method as recited in claim 2, wherein the step of generating weighted association rules from each frequent itemset comprises the steps of:
creating grids by dividing a weight range of each item into intervals;
determining a density of each grid as a number of tuples in each grid;
identifying dense boxes, where a coordinate on each dimension of a dense box gives the weight range of the corresponding item in the antecedent part of the rule; and
verifying a confidence and support requirement of the dense box.

7. A method as recited in claim 6, wherein the step of creating grids maintains a constant number of grids for each itemset regardless of the size of the itemset.

8. A method as recited in claim 6, further comprising the step of pruning sparse grids so as to reduce a number of grids that must be evaluated for density.

9. A method as recited in claim 6, wherein the step of identifying dense boxes comprises the steps of:

identifying a maximum dense region; and
shrinking the maximum dense region to a maximum dense box.

10. A method as recited in claim 9, wherein the step of shrinking uses a specific order on the dimensions to perform a shrinkage operation.

11. A method as recited in claim 10, further comprising the step of tracking candidates for additional shrinkage using a heap method so that a candidate with a largest volume is put on top of a heap.

12. A method as recited in claim 11, wherein the heap method comprises the steps of:
removing a top box of the heap;
generating all legitimate shrinkages of the removed box;
outputting a newly generated shrunk box as a weighted association rule, if both confidence and support requirement are satisfied;
otherwise, discarding a newly generated box, if support is not satisfied; and
putting a newly generated box back to the heap, if support is satisfied.

13. A method as recited in claim 10, further comprising the step of tracking candidates for additional shrinkage using a queue method.

14. A method as recited in claim 6, further comprising the step of maintaining two sets of counters for each n items set on a grid, a first set being primary counters that record support for the grid, and a second set being a set of projected counters where each records support of the grid projects on each (n−1) dimensional space.

15. A method as recited in claim 14, wherein a level-wise pruning method is provided for pruning the candidate counter set, comprising the steps of:
determining the projected counters from n-itemsets onto (n−1) itemsets;
using the projected counters from n-itemsets onto (n−1) itemsets to prune the primary counters for n-itemsets that needs to be evaluated;
determining remaining primary counters for n-itemsets; and
using the primary counters for n-itemsets to prune the projected counters for (n+1) itemsets onto n itemsets that need to be evaluated.

16. A method as recited in claim 2, wherein the step of generating frequent itemsets uses an iterative method.

17. A computer readable medium containing code for generating weighted association rules, each rule having an antecedent part and a consequent part, from a set of tuple lists, wherein each tuple comprises an item and an associated weight and each tuple list comprises a plurality of tuples, the code implementing step of generating weighted association rules wherein the consequent part of a rule comprises a first subset of items and the antecedent part of the rule comprises a second, non-overlapped, subset of items, and a range of weight values of each item is specified in the rule such that a number of tuples satisfying both the consequent part and the antecedent part of the rule exceeds a pre-specified support level, referred to as the support requirement, and a fraction of tuples satisfying the antecedent part also satisfying the consequent part exceeds a pre-specified confidence level, referred to as the confidence requirement and tuple density satisfying both the consequent part and the antecedent part of the rule exceeds a desired density level.

18. A computer readable medium containing code for generating weighted association rules from a set of tuple lists, wherein each tuple comprises an item and an associated weight and each tuple list comprises a plurality of tuples, the code implementing the steps of:

generating a plurality of frequent itemsets; and from each frequent itemset, generating weighted association rules, each rule having an antecedent part and a consequent part, wherein the consequent part of a rule is formed by a first subset of items from a tuple list and all remaining items in the tuple list form the antecedent part of the rule, and a range of a weight values of each item is specified in the rule so that support, confidence and density requirements are satisfied.

19. A computer readable medium as recited in claim 18, wherein all qualified weighted association rules are generated in the step of generating weighted association rules.

20. A computer readable medium as recited in claim 18, wherein a selected subset of all qualified weighted associate rules are generated in the step of generating weighted association rules.

21. A system for generating weighted association rules, each rule having an antecedent part and a consequent part, from a set of tuple lists, wherein each tuple comprises an item and an associated weight and each tuple list comprises a plurality of tuples, comprising:

means for storing computer readable data and computer code;

a first code section of said computer code stored in said storage means for generating weighted association rules, wherein the first code section generates weighted association rules where the consequent part of a rule comprises a first subset of items and the antecedent part of the rule comprises a second, non-overlapped, subset of items, and a range of weight values of each item is specified in the rule such that a number of tuples satisfying both the consequent part and the antecedent part of the rule exceeds a pre-specified support level, referred to as the support requirement, and a fraction of tuples satisfying the antecedent part also satisfying the consequent part exceeds a pre-specified confidence level, referred to as the confidence requirement and tuple density satisfying both the consequent part and the antecedent part of the rule exceeds a desired density level; and means for processing said first code section stored in said storage means, enabling use of the weighted association rules.

22. A system for generating weighted association rules from a set of tuple lists, wherein each tuple comprises an item and an associated weight and each tuple list comprises a plurality of tuples, comprising:

means for storing computer readable data and computer code;

a first code section of said computer code stored in said storage means for generating a plurality of frequent itemsets; and a second code section of said computer code stored in said storage means for generating weighted association rules from each frequent itemset, each rule having an antecedent part and a consequent part, wherein the consequent part of a rule is formed by a first subset of items from a tuple list and all remaining items in the tuple list form the antecedent part of the rule, and a range of a weight values of each item is specified in the rule so that support, confidence and density requirements are satisfied; and means for processing code sections stored in said storage means, enabling use of the generated weighted association rules.

23. A system as recited in claim 22, wherein the second code section generates all qualified weighted association rules.

24. A system as recited in claim 22, wherein the second code section generates a selected subset of all qualified weighted association rules.

25. A system as recited in claim 24, further comprising:

a third code section of said computer code stored in said storage means for selecting a set of desired frequent itemsets for weighted association rule generation; and a fourth code section of said computer code stored in said storage means for selecting a desired value for at least one threshold from a group of thresholds including support, interest and density.

26. A system as recited in claim 22, wherein the second code section of said computer code creates grids by dividing a weight range of each item into intervals; determines a density of each grid as a number of tuples in each grid; identifies dense boxes, where a coordinate on each dimension of a dense box gives the weight range of the corresponding item in the antecedent part of the rule; and verifies a confidence and support requirement of the dense box.

27. A system as recited in claim 26, wherein grid creation maintains a constant number of grids for each itemset regardless of the size of the itemset.

28. A system as recited in claim 26, further comprising an additional code section of said computer code stored in said storage means for pruning sparse grids so as to reduce a number of grids that must be evaluated for density.

29. A system as recited in claim 26, wherein dense box identification identifies a maximum dense region; and shrinks the maximum dense region to a maximum dense box.

30. A system as recited in claim 29, wherein shrinking the maximum dense region uses a specific order on the dimensions to perform a shrinkage operation.

31. A system as recited in claim 30, further comprising an additional code section of said computer code stored in said storage means for tracking candidates for additional shrinkage using a heap so that a candidate with a largest volume is put on top of a heap.

32. A system as recited in claim 31, wherein the additional code section using a heap for additional shrinkage removes a top box of the heap; generates all legitimate shrinkages of the removed box; outputs a newly generated shrunk box as a weighted association rule, if both confidence and support requirement are satisfied; otherwise, discards a newly generated box, if support is not satisfied; and puts a newly generated box back to the heap, if support is satisfied.

33. A system as recited in claim 30, further comprising an additional code section of said computer code stored in said storage means for tracking candidates for additional shrinkage using a queue.

34. A system as recited in claim 26, further comprising an additional code section of said computer code stored in said storage means for maintaining two sets of counters for each n items set on a grid, a first set being primary counters that record support for the grid, and a second set being a set of projected counters where each records support of the grid projects on each (n−1) dimensional space.

35. A system as recited in claim 34, further comprising a second additional code section of said computer code stored in said storage means for level-wise pruning of the candidate counter set, wherein level-wise pruning determines the projected counters from n-itemsets onto (n−1) itemsets; uses the projected counters from n-itemsets onto (n−1) itemsets to prune the primary counters for n-itemsets that needs to be evaluated; determines remaining primary counters for n-itemsets; and uses the primary counters for n-itemsets to prune the projected counters for (n+1) itemsets onto n itemsets that need to be evaluated.

36. A system as recited in claim 22, wherein the first code section generates frequent itemsets iteratively.

* * * * *